United States Patent [19]

Nomura et al.

[11] Patent Number: 5,241,644
[45] Date of Patent: Aug. 31, 1993

[54] QUEUE HAVING LONG WORD LENGTH

[75] Inventors: Masahiro Nomura; Shigetatsu Katori, both of Tokyo, Japan

[73] Assignee: NEC Corporation, Tokyo, Japan

[21] Appl. No.: 728,794

[22] Filed: Jul. 8, 1991

Related U.S. Application Data

[63] Continuation of Ser. No. 219,345, Jul. 15, 1988, abandoned.

[30] Foreign Application Priority Data

Jul. 15, 1987 [JP] Japan ............................. 62-177628

[51] Int. Cl.⁵ ............................................. G06F 12/00
[52] U.S. Cl. ........................ 395/425; 364/DIG. 1; 364/238.7; 364/247.7; 364/254.5; 364/260.4
[58] Field of Search ....................... 395/425, 250, 375

[56] References Cited

U.S. PATENT DOCUMENTS

| 4,109,310 | 8/1978 | England et al. ............ 395/375 |
| 4,507,732 | 3/1985 | Catiller et al. ............ 395/275 |
| 4,525,804 | 6/1985 | Mosier et al. ............. 395/250 |
| 4,847,759 | 7/1989 | Oklobdxija ............... 395/425 |

OTHER PUBLICATIONS

Pancost et al., "Shift Register FIFO", Motorola Technical Disclosure Bulletin, vol. 3, No. 1, pp. 79-80, Mar. 1983, Schaumburg, Ill.

*Primary Examiner*—Debra A. Chun
*Attorney, Agent, or Firm*—Foley & Lardner

[57] ABSTRACT

A queue apparatus comprises a multi-stage queue latch for storing instruction codes or data in a first-in first-out manner; a first queue pointer associated with the queue latch for indicating a read position of an upper half place portion of the instruction codes or data stored in the queue latch and a second queue pointer associated with the queue latch for indicating a reading position of a lower half place portion of the instruction codes or data stored in the queue latch. An exchanger is coupled in order to the queue latch to receive the upper and lower half place portions of the instruction codes or data read out form the queue latch and for selectively exchanging the positions of the received upper and lower half place portions.

8 Claims, 9 Drawing Sheets

QUEUE HAVING LONG WORD LENGTH

This application is a continuation of application Ser. No. 07/219,345, filed Jul. 15, 1988, now abandoned.

BACKGROUND OF THE INVENTION

1. Field of the Invention

The present invention relates to a queue apparatus for use in a pre-processing executed in a microcomputer, and more specifically to such a queue apparatus capable of storing and outputting instruction codes or data of a long word length.

2. Description of Related Art

In general, pipelined micrcomputers comprise a buffer or queue for storing instruction codes or data prefetched from a memory.

However, the conventional queue has been made to read out only data of a fixed length. For example, if minimum unit of data read out from the queue is one word, it is not possible to make the bit length of a code or data read out from the queue latch longer than one word. In other words, the data width of the conventional queue is limited by the minimum unit of the width of the read out data. This fixed data width of the queue has become a large hindrance in increasing the execution speed by enhancement of hardware of an instruction execution unit, and also in increasing processing power of the microcomputer by increasing the width of a bus for fetching instruction codes from a memory. This is because the fixed data width of the queue will limit the supply of the instruction codes to the execution unit resulting in a bottle neck and consequently restrain the increase of the processing power.

SUMMARY OF THE INVENTION

Accordingly, it is an object of the present invention to provide a queue which has overcome the above mentioned defect of the conventional queue.

Another object of the present invention is to provide a queue having a long word length so as to supply a large amount of instructions or data at a high speed.

Still another object of the present invention is to provide a queue capable of storing and supplying a variable length of instructions of data.

The above and other objects of the present invention are achieved in accordance with the present invention by a queue apparatus comprising a multi-stage memory unit for storing instruction codes or data in a first-in first-out manner; first reading position indicating unit coupled to the memory unit for indicating a read position of an upper half place portion of the instruction codes or data stored in the memory unit means; second read position indicating unit coupled to the memory unit for indicating a reading position of a lower half place portion of the instruction codes or data stored in the memory unit; a unit coupled to the memory unit to receiving the upper and lower half place portions of the instruction codes or data read out from the memory unit and for selectively exchanging the positions of the received upper and lower half place portions of the instruction codes or data to each other, and a unit responding to a read signal and a write signal from an external for controlling the first and second read position indicating unit and selectively activating or inactivating the exchanging unit.

With the above mentioned arrangement, if the width of a write data to the queue is set to two words, the width of a read data from the queue can be selectively changed between one word and two words by controlling the exchanging unit. Accordingly, the limit of the read data width of the queue is overcome, and therefore, a sufficient required amount of the instruction codes can be supplied to the execution unit without limit the instruction code supply. As a result, it is possible to increase the processing power of the microcomputers.

In one embodiment of the invention, the memory unit includes m-stage n-work queue (where m is integer and n is even integer) coupled to a bus controller to receive instruction codes or data in units of n words, and the exchanging unit is coupled to the queue to independently receive an upper place n2-word portion and a lower place n/2-word portion of the instruction codes or data latched in the queue, respectively and selectively exchanges the positions of the received upper place and lower place n/2-word portions to each other.

Further, the first reading position indicating unit includes a first queue pointer of one-bit width (m+1)-stages associated to the queue so as to indicate the read position of the upper place n/2-word portion of the instruction codes or data latched in the queue, and the second reading position indicating unit includes a second queue pointer of one-bit width (m+1)-stages associated to the queue so as to indicate the read position of the lower place n/2-word portion of the instruction codes or data latched in the queue. Each of the queue pointers is such that only one stage is set with a predetermined bit which indicates the reading position, and when the predetermined bit is positioned at an first stage, it indicates that the queue is empty.

In addition, the controlling unit includes a queue controller receiving a write signal from the bus controller and first and second read signals from an execution unit receiving the instruction codes or data, the queue controller responding to the received signals to selectively shift the first and second queue pointers either toward an input side or toward an output side. Specifically, m is 1 and n is 2.

According to another aspect of the present invention, there is provided a queue apparatus comprising a multi-stage memory unit for storing instruction codes or data in a first-in first-out manner; first reading position. indicating unit coupled to the memory unit for indicating a read position of a first portion of the instruction codes or data stored in the memory unit; second read position indicating unit coupled to the memory unit for indicating a reading position of a second portion of the instruction codes or data stored in the memory unit; a unit coupled to the memory unit to receiving the first and second portions of the instruction codes or data read out from the memory unit and for selectively exchanging the positions of the first and second portions of the instruction codes or data to each other, and a unit responding to a read signal and a write signal from an external for controlling the first and second read position indicating unit and selectively activating or deactivating the exchanging unit.

The above and other objects, features and advantages of the present invention will be apparent from the following description of preferred embodiments of the invention with reference to the accompanying drawings.

BRIEF DESCRIPTION OF THE DRAWINGS

FIGS. 6A to 10B illustrate the conditions of the instruction queue latch, the queue pointers and the exchanger in the instruction code fetch unit shown in FIG. 5 under five different cases, respectively.

DESCRIPTION OF THE PREFERRED EMBODIMENTS

Figure 1:
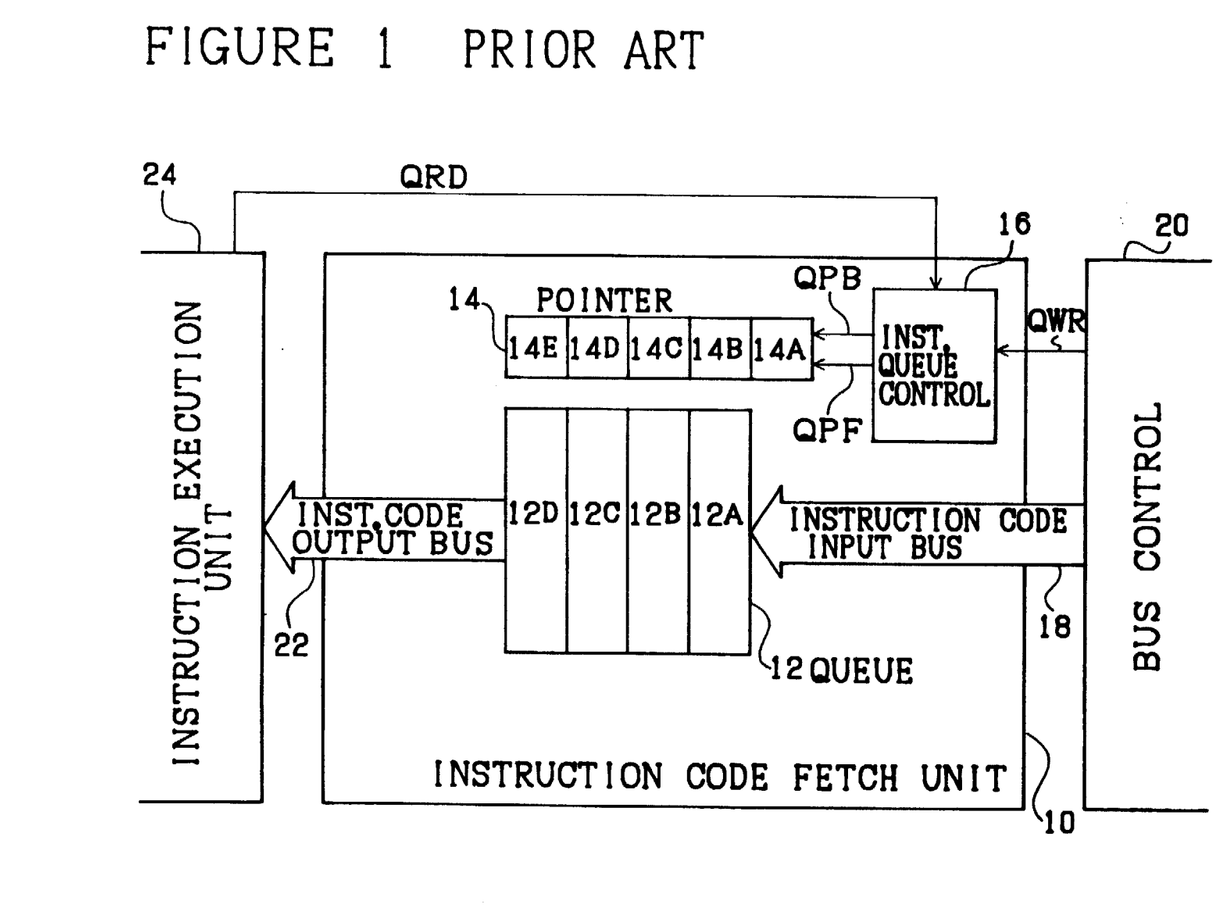
FIG. 1 is a diagram of a typical instruction code fetch unit which has an instruction code prefetch queue and which is used in conventional pipelined microcomputers.

Referring to FIG. 1, there is shown a diagram of a typical instruction code fetch unit which has an instruction code prefetch queue and which is used in conventional pipelined microcomputers.

An instruction code fetch unit includes an instruction queue latch 12 for storing instruction codes in units of one word and in a first-in first-out manner, and in a instruction queue pointer 14 for indicating an read position of the instruction queue latch 12. The instruction code fetch unit 10 also includes an instruction queue controller 16.

In addition, the instruction code fetch unit 10 is coupled through an instruction code input bus 18 of one word length to a bus controller 20 which operates to read an instruction code form a memory (not shown) and to read and write data from and to the memory. The instruction code fetch unit 10 is also coupled via an instruction code output bus 22 of one word length with an execution unit 24 for executing an instruction read from the instruction queue latch 12.

The instruction queue latch 12 consists of a shift register having four stages 12A, 12B, 12C and 12D and having the width of one word (1 word×4 stages). This instruction queue latch 12 is adapted so that when a content of the input bus 18 is fetched into the first shift register stage 12A of the queue latch 12 in response to a write signal to the queue latch 12, all the contents stored in the shift register stages 12A to 12D are shifted by one stage toward the output side.

The instruction queue pointer 14 consists of a one-bit width shift register having five stages 14A, 14B, 14C, 14D and 14E (1 bit×5 stages), and is adapted so that only one stage of the shift register is set to "1" and the other stages are maintained at "0". Thus, the stage set to "1" indicates a one word instruction code read position of the queue latch 12, namely the position of a one-word instruction code read out to the execution unit 24 through the output bus 22.

When the queue latch 12 is in empty, namely when there is no effective instruction code in the queue latch 12, the first stage 14A of the pointer 14 is set to "1".

As seen from above, instruction codes which have been read from the memory by the bus controller 20 are written to the instruction code queue latch 12 in units of one word, and then, an instruction code is read from the instruction queue latch 12 to the execution unit 24 in units of one word.

The instruction queue controller 16 receives from the bus controller 20 an instruction code write signal QWR indicating to write the instruction codes to the instruction queue latch 12 in units of one word. The instruction queue controller 16 also receives from the execution unit 24 an instruction code read signal QRD indicating to read the instruction codes from the instruction queue latch 12 in units of one word. The instruction queue controller 16 controls the operation of the pointer 14 on the basis of the instruction code write signal QWR and the instruction code read signal QRD. Specifically, the instruction queue controller 16 outputs to the instruction queue pointer 14, a first control signal QPB for indicating a shift of "1" toward the input side by one stage, and a second control signal QPF for indicating a shift of "1" toward the output side by one stage.

Now, operation of the instruction queue fetch unit 10 will be examined.

A combination of the writing operation to the instruction queue latch 12 and the reading operation from the instruction queue latch 12 can be classified into he following three cases:

(1) First case in which only the writing to the instruction queue latch 12 is executed by the bus controller 20 (the QWR signal is active);

(2) Second case in which only the reading from the instruction queue latch 12 to the execution unit 24 is performed (the QRD signal is active); and (3) Third case in which the writing to the instruction queue latch 12 by the bus controller 20 and the reading from the instruction queue latch 12 to the execution latch 24 are simultaneously performed (both the QWR signal and the QRD signal are active).

Figure 2:
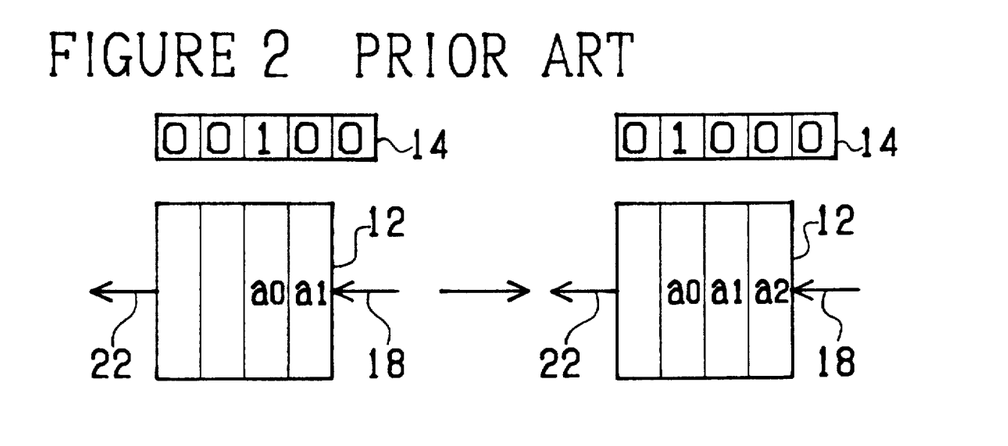
FIGS. 2 to 4 illustrate the conditions of the instruction queue latch and the queue pointer in the FIG. 5 is a diagram of an instruction code fetch unit in accordance with the present invention which has an instruction code prefetch queue.
Figure 3:
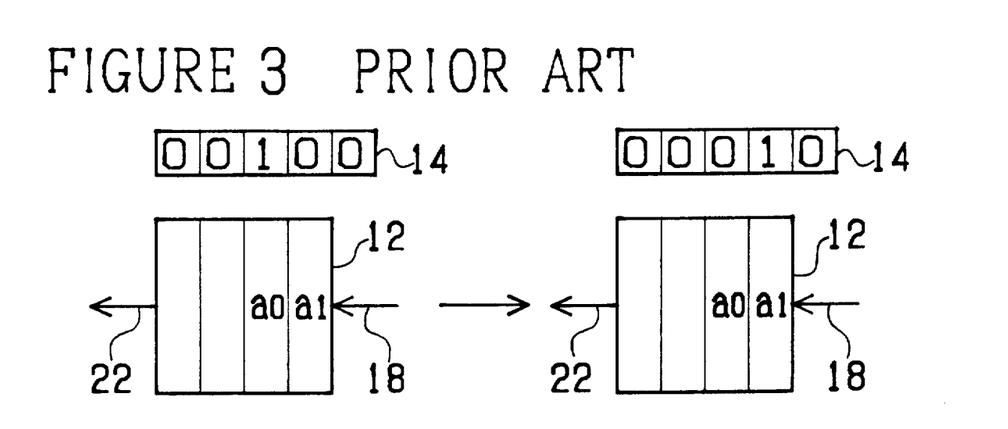
Figure 4:
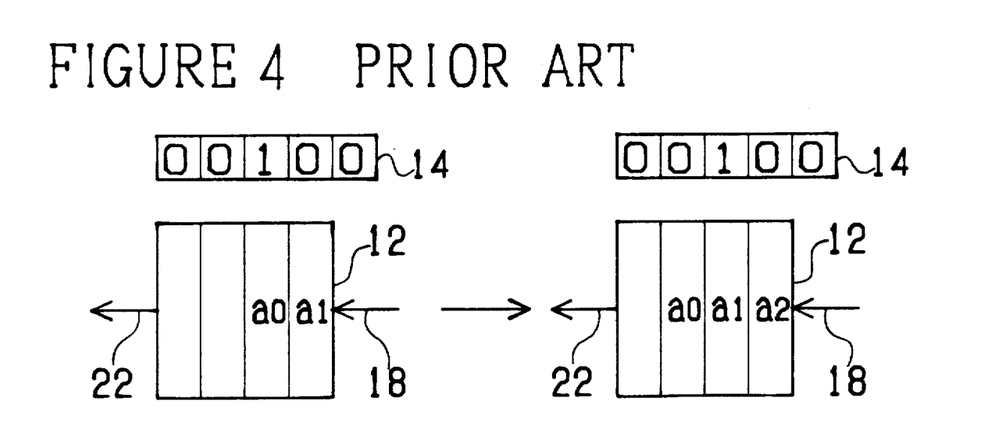

Referring to FIGS. 2 to 4, there are illustrated the conditions of the instruction queue latch 12 and the queue pointer 14 in the above three cases, respectively. In these drawings, "a0", "a1" and "a2" are indicative of instruction codes in the queue latch 12. In addition, the status shown at the left side is changed to the status shown at the right side.

In the first case, as shown in FIG. 2, the contents of the instruction queue latch 12 are shifted toward the output side by one stage, and the instruction queue controller 16 activates the QPF signal so that the instruction pointer 14 is shifted toward the output side by one stage. Accordingly, the instruction code "a0" outputted to the instruction code output bus 22 is not changed.

In the second case, as shown in FIG. 3, the contents of the instruction queue latch 12 are not shifted, and the instruction queue controller 16 activates the QPB signal so that the instruction pointer 14 is shifted toward the input side by one stage. Accordingly, a next instruction code "a1" is outputted to the instruction code output buss 22.

In the third case, as shown in FIG. 4, the contents of the instruction queue latch 12 are shifted toward the output side by one stage, and the instruction queue controller 16 activates neither the NPF signal nor the QPB signal so that the instruction pointer 14 is not shifted. Accordingly, a next instruction code "a1" is outputted to the instruction code output bus 22.

Figure 5:
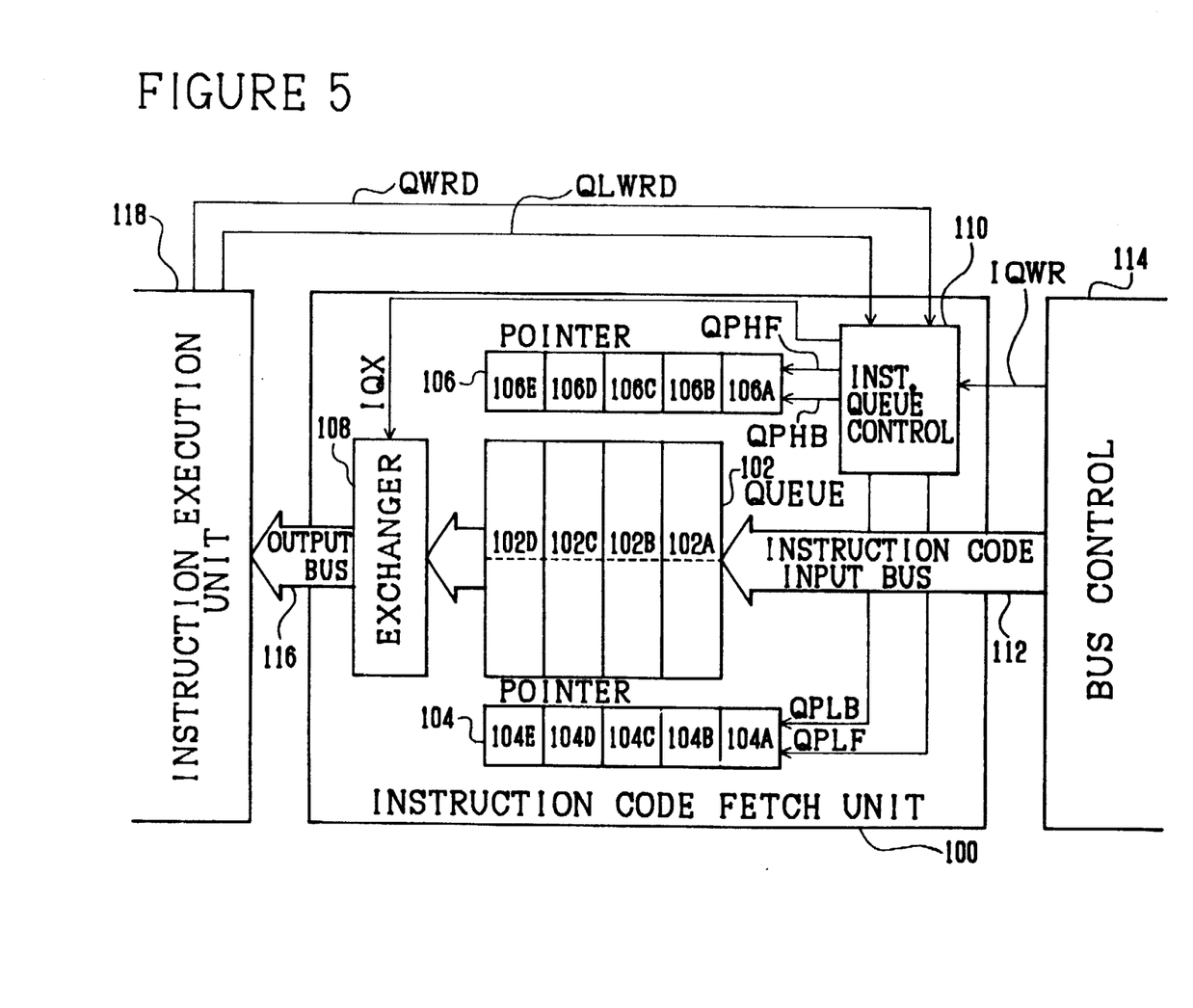

Referring to FIG. 5, there is shown a block diagram of one embodiment of an instruction code fetch unit in accordance with the present invention which has an instruction code prefetch queue and which can be used in microcomputers.

An instruction code fetch unit, indicated by Reference Numeral 100, includes an instruction queue latch 102 for storing instruction codes in units of two words and in a first-in first-out manner, a lower place instruction queue pointer 104 for indicating a read position for a lower one-word portion of each two-word instruction code latched in the instruction queue latch 102, and an upper place instruction queue pointer 106 for indicating an upper place position for an upper one-word portion of each two-word instruction code latched in the instruction queue latch 102. The instruction code fetch unit 100 also includes an instruction queue exchanger 108 receiving the lower one-word data and the upper one-word data outputted from the instruction queue latch 102 and selectively exchanging the positions of the lower and upper place one-word data with each other, and an instruction queue controller 110 for controlling the pair of queue pointers 104 and 106 and the exchanger 108.

In addition, the instruction code fetch unit 100 is coupled through an instruction code input bus 112 of a two-word length to a bus controller 114 which operates to read an instruction code from a memory (not shown) and to read and write data and to the memory. The instruction code fetch unit 100 is also coupled through an instruction code output bus 116 of two-words in length to an execution unit 118 for executing an instruction read from the instruction queue latch 102.

The instruction queue latch 102 consists of a shift register having four stages 102A, 102B, 102C and 102D and having the width of two words (2 words × 4 stages). This instruction queue latch 102 is adapted so that when a content of two-words in width on the input bus 112 is fetched into the first shift register stage 102A of the queue latch 102 in response to a write signal to the queue latch 12, all of the contents stored in the shift register stage 102A to 102D are shifted by one stage toward the output side.

The lower place instruction queue pointer 104 consists of a one-bit width shift register having five stages 104A, 104B, 104C, 104D and 104E (1 bit × 5 stages), and is adapted so that only one stage of the shift register is necessarily set to "1" and the other stages are maintained at "0". Namely, the stage set with "1" indicates a read position for the lower place one-word portion of the instruction codes latched in the queue latch 102.

The upper place instruction queue pointer 106 also consists of a one-bit width shift register having five stages 106A, 106B, 106C, 106D and 106E (1 bit × 5 stages), and is adapted so that only one stage of the shift register is necessarily set to "1" and the other stages are maintained at "0". Namely, the stage set with "1" indicates a read position for the upper place one-word portion of the instruction codes latched in the queue latch 102

When the queue latch 102 is empty, namely when there is no effective code in the queue latch 102, "1" is set at the stage 104A of the pointer 104 and the stage 106A of the pointer 106.

As seen from the above, instruction codes which have been read from the memory by the bus controller 114 are written to the instruction queue latch 102 in units of two words, and then, an instruction code is read from the instruction queue latch 102 to the execution unit 118 in units of one word or in units of two words.

The instruction queue controller 110 receives from the bus controller 114 an instruction code write signal IQWR indicating to write the instruction codes to the instruction queue latch 102 in units of two words. The instruction queue controller 110 also receives from the execution unit 118 a first instruction code read signal QWRD indicating to read the instruction code form the instruction queue latch 102 in units of one word, and a second instruction code read signal QLWRD indicating to read the instruction code from the instruction queue latch 102 in units of two words. The instruction queue controller 110 controls the operation of the pointers 104 and 106 and the exchanger 108 on the basis of the instruction code write signal QWR and the instruction code read signals QWRD and QLWRD.

Specifically, the instruction queue controller 110 outputs to the lower place instruction queue pointer 104, a first control signal QPLB for indicating a shift of "1" toward the input side by one stage, and a second control signal QPLF for indicating a shift of "1" toward the output side by one stage. Further, the instruction queue controller 110 outputs to the upper place instruction queue pointer 106, a first control signal QPHB for indicating a shift of "1" toward the input side by one stage, and a second control signal QPHF for indicating a shift of "1" toward the output side by one stage. In addition, the instruction queue controller 110 outputs an exchange signal IQX to the exchanger 108 for controlling the place inversion of the lower and upper place one-word data portions outputted from the instruction queue 102.

Now, operation of the instruction queue fetch unit 100 will be described.

A combination of the writing operation to the instruction queue latch 102 and the reading operation from the instruction queue latch 102 can be classified into the following five cases:

(1) First case in which only the writing of two words to the instruction queue latch 102 is executed by the bus controller 114 (the IQWR signal is active);

(2) Second case in which only the reading of one word from the instruction queue latch 102 to the execution unit 118 is performed (the QWRD signal is active);

(3) Third case in which only the reading of two words from the instruction queue latch 102 to the execution unit 118 is performed (the QLWRD signal is active); and (4) Fourth case in which the writing of two words to the instruction queue latch 102 by the bus controller 114 and the reading of one word from the instruction queue latch 102 to the execution unit 118 are simultaneously performed (both of the IQWR signal and the QWRD signal are active).

(5) Fifth case in which the writing of two words to the instruction queue latch 102 by the bus controller 114 and the reading of two words from the instruction queue latch 102 to the execution unit 118 are simultaneously performed (both of the IQWR signal and the QLWRD signal are active).

Referring to FIGS. 6A to 10B, there are illustrated the conditions of the instruction queue latch 102, the queue pointers 104 and 106 and the exchanger 108 in the above five cases, respectively. In these drawings, "a0", "a1", "a2" and "a3" are indicative of instruction codes in the queue latch 102. In addition, the status shown at the left side is changed to the status shown at the right side.

Figure 6A:
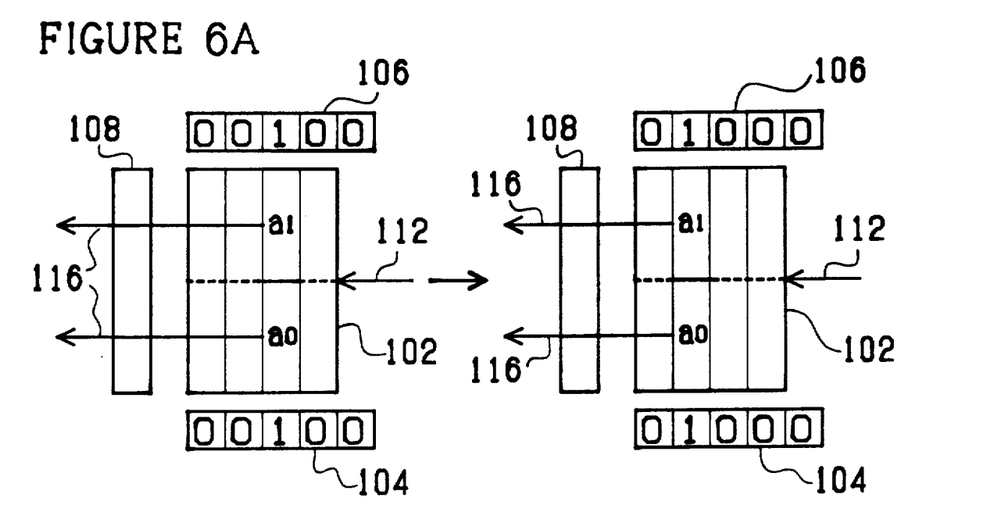
Figure 6B:
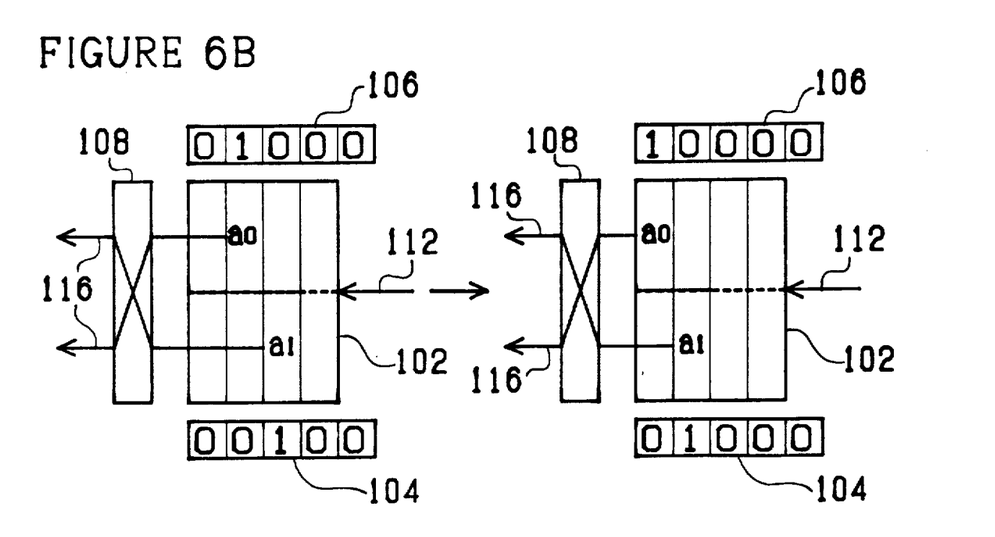

For the first case, reference should be made to FIGS. 6A and 6B. FIG. 6A shows the case in which the IQX signal is "0" and FIG. 6B shows the case in which the IQX signal is "1", namely the exchanger 108 exchanges the positions of the two received one-word data portions to each other. In either case, the contents of the instruction queue latch 102 are shifted toward the output side by one stage, and the instruction queue controller 110 actives the QPLF signal and the QPHF signal so that the lower place and upper place instruction pointers 104 and 106 are shifted toward the output side by one stage. Accordingly, the instruction codes "a0" and "a1" outputted to the instruction code output bus 116 are not changed. In addition, in this case, the status of the exchanger 108 is not changed.

Figure 7A:
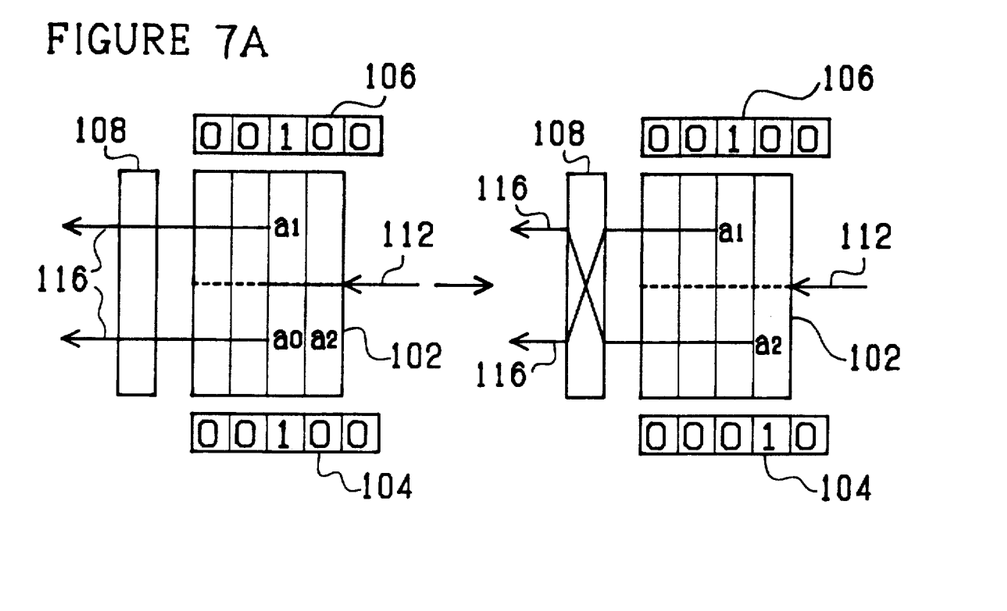
Figure 7B:
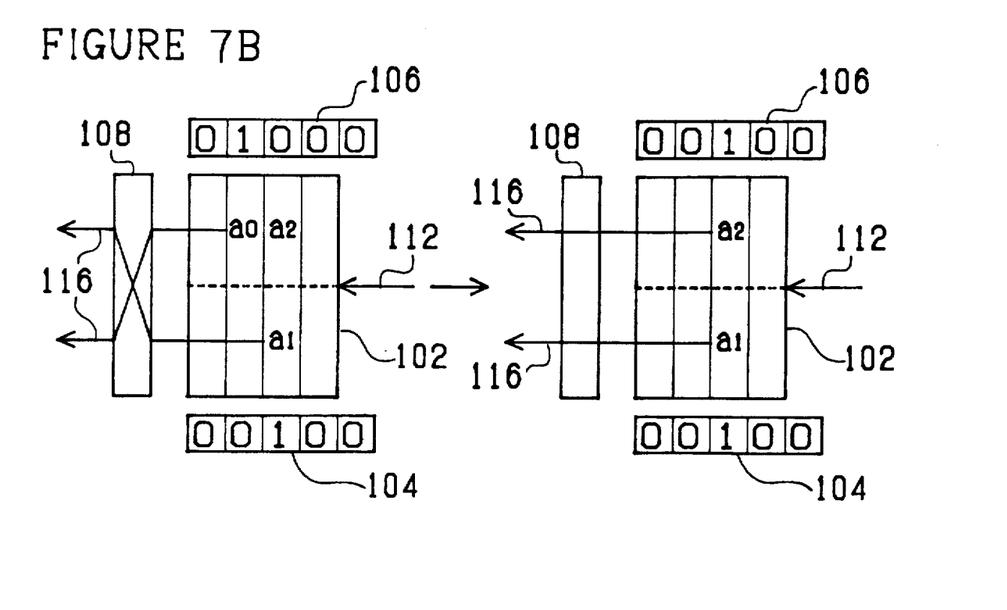

For the second case, reference should be made to FIGS. 7A and 7B. FIG. 7A shows the case in which the IQX signal is "0" and FIG. 7B shows the case in which IQX signal is "1". In the second case, the contents of the instruction queue latch 102 are not shifted, and the instruction queue controller 110 activates the QPLB signal in the case of the IQX signal being "0", so that the lower place instruction pointer 104 is shifted toward the input side by one stage. In addition, the IQX signal is made to "1" so that the upper and lower place one-word data portions outputted from the queue latch 102 are exchanged with each other. On the other hand, if the IQX was of "1", the instruction queue controller 110 activates the QPHB signal so that the upper place instruction pointer 104 is shifted toward the input side by one stage. In addition, the IQX signal is returned to "0". Accordingly, next instruction codes "a1" and "a2" of two words in total are outputted to the instruction code output bus 116.

Figure 8A:
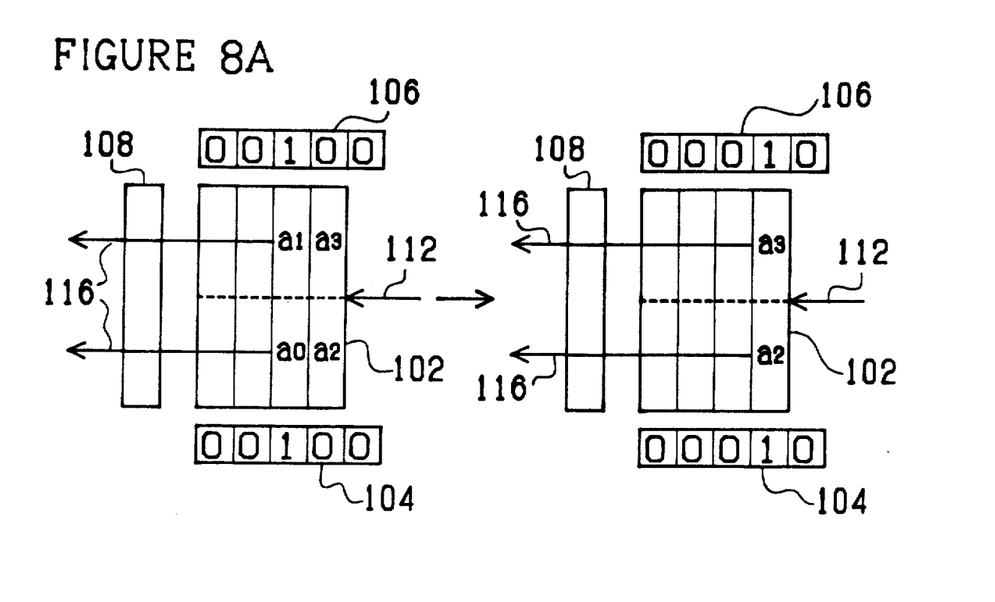
Figure 8B:
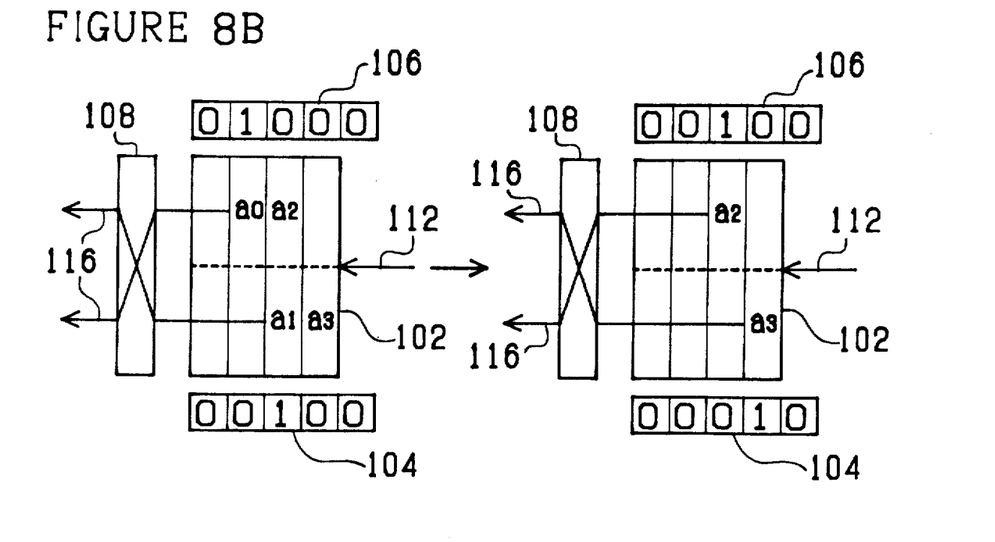

For the third case, reference should be made to FIGS. 8A and 8B. FIG. 8A shows the case in which the IQX signal is "0" and FIG. 8B shows the case in which the IQX signal is "1". In this case, the contents of the instruction queue latch 102 are not shifted, and the instruction queue controller 110 activates both the OPLB signal and the QPHB signal so that both the lower place and upper place instruction pointers 104 and 106 are shifted toward the input side by one stage. Accordingly, next instruction codes "a2" and "a3" of two words in total are outputted to the instruction code output bus 116. In this case, the status of the exchanger 108 is not changed.

Figure 9A:
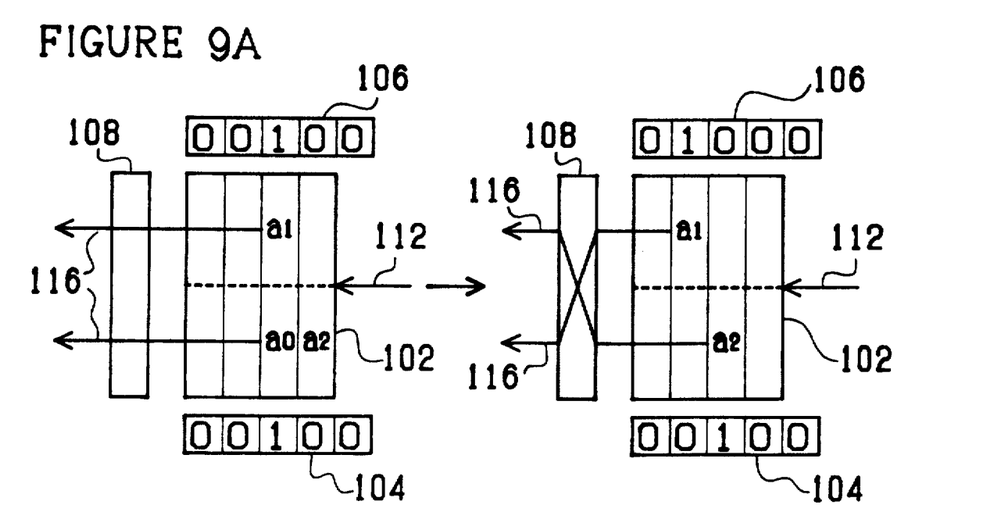
Figure 9B:
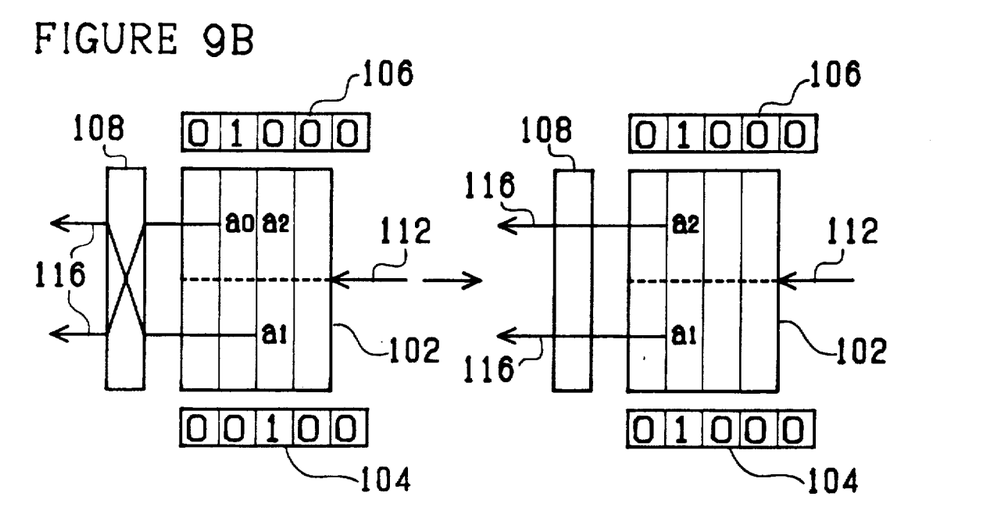

For the fourth case, reference should be made to FIGS. 9A and 9B. FIG. 9A shows the case in which the IQX signal is "0" and FIG. 9B shows the case in which the IQX signal is "1". In this case, the contents of the instruction queue latch 102 are shifted toward the output side by one stage, and the instruction queue controller 110 activates the QPHF signal in the case of the IQX signal being of "0", so that the upper place instruction pointer 106 is shifted toward the output side by one stage. In addition, the IQX signal is made "1" so that the upper and lower place one-word data portions outputted from the queue latch 102 are exchanged with each other. On the other hand, if the IQX was "1", the instruction queue controller 110 activates the QPLF signal so that the lower place instruction pointer 106 is shifted toward the output side by one stage. In addition, the IQX signal is returned to "0". Accordingly, next instruction codes "a1" and "a2" of two words in total are outputted to the instruction code output bus 116.

Figure 10A:
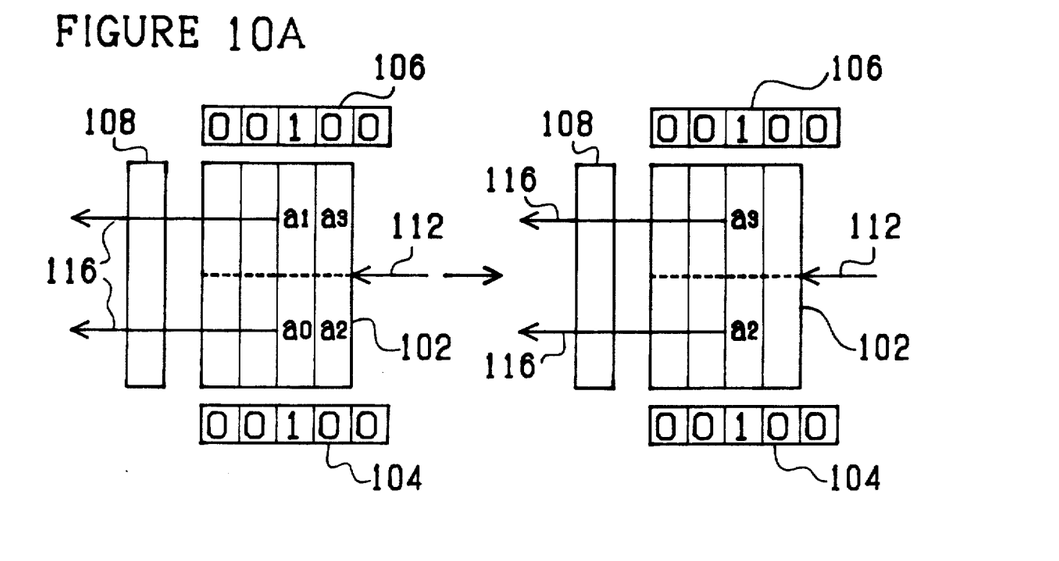
Figure 10B:
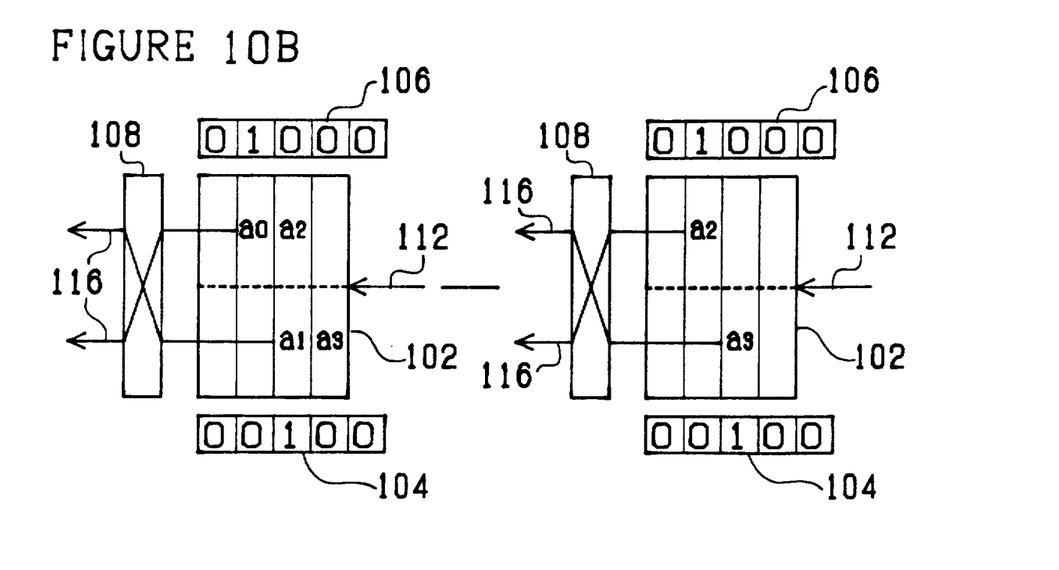

For the fifth case, reference should be made to FIGS. 10A and 10B. FIG. 10A shows the case in which the IQX signal is "0" and FIG. 10B shows the case in which the IQX signal is "1". The contents of the instruction queue latch 102 are shifted toward the output side by one stage, and on the other hand, lower place and upper place instruction queue pointers 104 and 106 and he exchanger 108 are maintained as they are. Accordingly, next instruction codes "a2" and "a3" of two words in total are outputted to the instruction code output bus 116.

Figure 11:
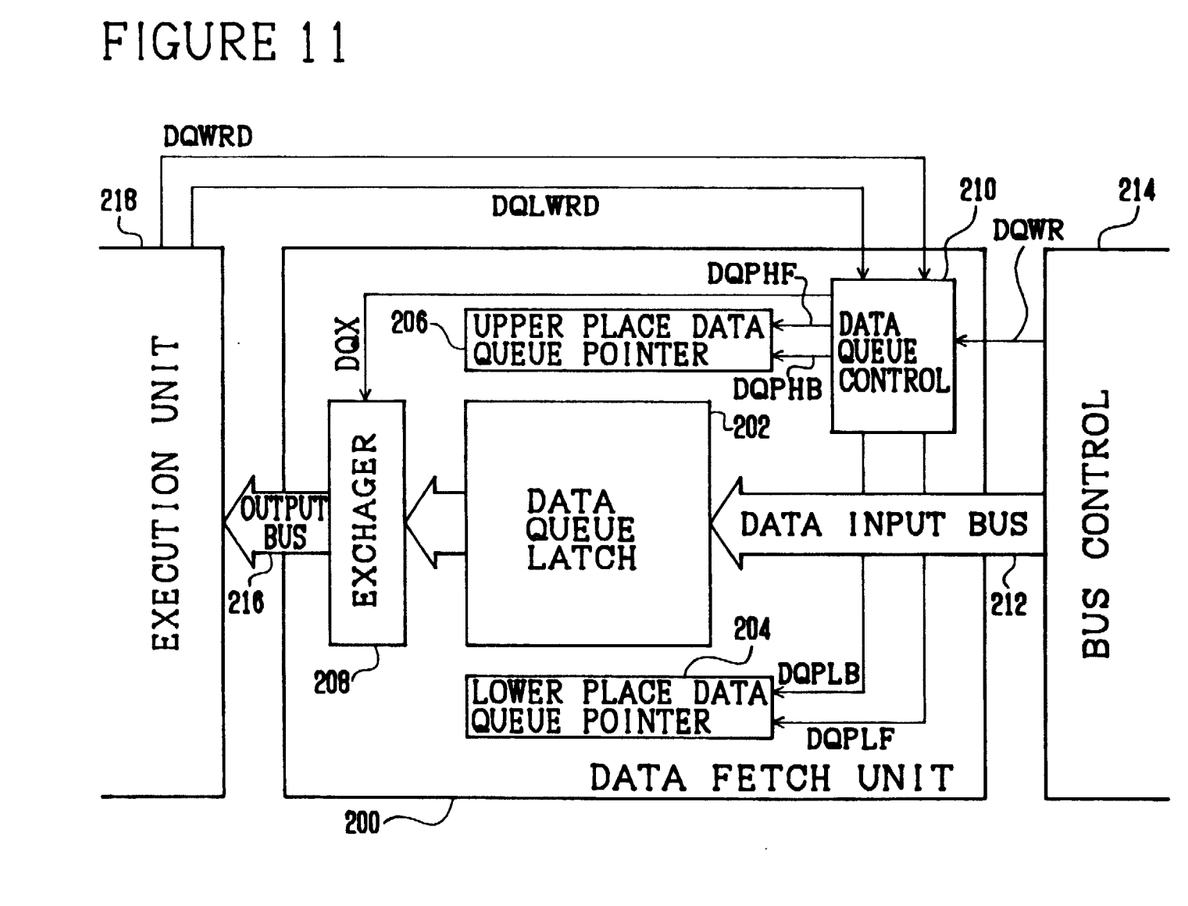
FIG. 11 is a diagram of one embodiment of a data fetch unit in accordance with the present invention having a data block prefetch queue.

Turning to FIG. 11, there is shown a block diagram of one embodiment of a data fetch unit in accordance with the present invention having a data block prefetch queue, which can be used in microcomputers.

A data fetch unit, indicated by 200, includes a data queue latch 202 for storing data in units of two words and in a first-in first-out manner, a lower place queue pointer 204 for indicating a read position for a lower place one-word portion of the two-word data latched in the data queue latch 202, and an upper place data queue pointer 206 for indicating a read position for an upper place one-word portion of the two-word data latched in the data queue latch 202. The data fetch unit 200 also includes a data queue exchanger 208 receiving the lower place one-word data and the upper place one-word data outputted from the data queue latch 202 and selectively exchanging the positions of the lower place and upper place one-word data portions with each other, and a data queue controller 210 for controlling the pair of queue pointers 204 and 206 and the exchanger 208.

In addition, the data fetch unit 200 is coupled through a data input bus 212 of two-word length to a bus controller 214 which operates to read and write data from and to a memory (not shown). The data fetch unit 200 is also coupled through a data output bus 216 of two-word length to an execution unit 218 for processing the data read from the instruction queue latch 202.

The data queue latch 202, the lower place data queue pointer 204 and the upper place data queue pointer 206 have the same hardware structures as the queue latch 102 and the pointers 104 and 106 shown in FIG. 5, respectively.

Data which as been read from the memory by the bus controller 214 are written to the data queue latch 102 in units of two words, and then, data is read from the data queue latch 202 to the execution unit 218 in units of one word or in units of two words.

The data queue controller 120 receives from the bus controller 214 a data write signal DQWR indicating to write the data to the data queue latch 202 in units of two words. The data queue controller 210 also receives from the execution unit 218 a first read data signal DQWRD indicating to read the data from the instruction queue latch 202 in units of one word, and a second data read signal DQLWRD indicating to read the data from the instruction queue latch 202 in units of two words. The data queue controller 210 controls the operation of the pointers 204 and 206 and the exchanger 208 on the basis of the data write signal DQWR and the data read signals DQWRD and DQLWRD.

Namely, the data queue controller 210 supplies the lower place data queue pointer 204 with a first control signal LQPLB for indicating a shift of "1" toward the input side by one stage, and a second control signal DQPLF for indicating a shift of "1" toward the output side by one stage. Further, the data queue controller 210 output to the upper place data queue pointer 206, a first control signal DQPHB for indicating a shift of "1" toward the input side by one stage, and a second control signal DQPHF for indicating a shift of "1" toward the output side by one stage. In addition, the data queue controller 210 outputs an exchange signal DQX to the exchanger 208 for controlling the place inversion of the lower and upper place one-bit data portions outputted from the data queue 202.

The above mentioned data fetch unit 200 will operate in the same manner as that of the instruction code fetch unit 100 as described heretofore, and therefore, explanation of the operation will be omitted.

As seen from the above, the queue apparatus mentioned above is such that code or data having the width of two words can be written into the queue and code or data can be read out from the queue either in units of one word or in units of two words. Therefore, if the queue apparatus is incorporated as an instruction code prefetch queue for microcomputers or a data queue which processes a group of data transferred in the form of a block, the following advantages can be obtained:

(1) It is possible to remove the limit of the instruction code supply to the instruction execution unit due to the limited data width of the instruction queue, so that a sufficient required amount of instruction codes are supplied, with the result that processing power of the microcomputer is elevated.

(2) Since a variable length of instruction codes are read out from the instruction queue, it is possible to read an immediate data in the instruction codes at a high speed and therefore to increase the instruction execution speed.

(3) If it is used as the data queue, a group of data including one-word length data and two-word length data in a mixed condition are previously transferred to the data queue in units of a block, and when instruction is executed, data can be read from the queue in accordance with an inherent length of each item of data. Therefore, it is possible to execute, in a pipelined manner, the block transfer of data from the memory and the internal processing of the microcomputer for the transferred data, with the result that processing the data block can greatly elevated.

In the above mentioned embodiments, the queue has the data width of two words. But, the data width is not limited to the two words and can assume any length. In addition, the instruction codes and data is divided into two parts, but can be divided into three or more by correspondingly increasing the number of the queue pointers and the number of channels exchanged by the exchanger.

The invention has thus been shown and described with reference to the specific embodiments. However, it should be noted that the present invention is in no way limited to the details of the illustrated structures but changes and modifications may be made within the scope of the appended claims.

We claim:

1. A queue apparatus comprising:
a multi-stage memory means for storing instruction codes or data in a first-in first-out manner, said multi-stage memory means having a plurality of stages, each stage storing instruction codes or data which can be divided into an upper half, including a most significant bit of said instruction codes or data stored in each of said stages, and a lower half, including a least significant bit of said instruction codes or data stored in each of said stages;
first position indicating means, coupled to said multi-stage memory means, for indicating a head position of upper halves of all instruction codes or data stored in said plurality of stages of said multi-stage memory means;
second position indicating means, coupled to said multi-stage memory means, for indicating a head position of lower halves of all instruction codes or data stored in said plurality of stages of said multi-stage memory means;
exchanging means, coupled to said multi-stage memory means, for receiving upper and lower halves of instruction codes or data read out from said multi-stage memory means and for selectively exchanging respective portions of received upper and lower halves of instruction codes or data with each other; and
control means receiving a first read signal and second read signal from an execution unit and a write signal from a bus controller, respectively, said first read signal indicating a reading of a half of one instruction code stored in one stage of said multi-stage memory means, and said second read signal indicating a reading of both of said upper and lower halves of one instruction code stored in one stage of said multi-stage memory means, said control means responding to said write signal and said first and second read signals for controlling said first and second position indicating means so as to cause said first and second position indicating means to shift toward an output side of said multi-stage memory means an indication position of respective head positions of the upper and lower halves of all instruction codes or data stored in said plurality of stages of said multi-stage memory means, said control means responding to said first read signal so as to cause only one of said first and second position indicating means to shift toward an input side of said multi-stage memory means, the indication position of the head position of the corresponding half of all instruction codes or data stored in said plurality of stages of said multi-stage memory means and said control means responding to said second read signal so as to cause both of said first and second position indicating means to shift the indication position of the respective head positions of the upper and lower halves of all instruction codes or data stored in said plurality of stages of said multi-stage memory means toward an input side of said multi-stage memory means, said control means also operating in such a manner that when said second read signal is generated, on the basis of said first and second halves of said multi-stage memory means, instruction codes or data are read in response to the first read signal most recently before said second read signal is generated, said control means controls said exchanging means such that instruction codes or data read out from said multi-stage memory means are outputted to said execution unit in a proper sequence in which said upper and lower halves of said instruction codes or data read out from said multi-stage memory means are arranged in accordance with a proper order of address.

2. A queue apparatus as claimed in claim 1, wherein said multi-stage memory means includes an m-stage n-word queue (where m is an integer and n is an even integer) coupled to the bus controller for receiving instruction codes or data in units of n words, said exchanging means being coupled to said m-stage n-word queue to independently receive the upper half and the lower half of the instruction codes or data latched in said m-stage n-word queue, wherein the upper half and the lower half of the instruction codes or data are each n/2 words in length.

3. A queue apparatus as claimed in claim 1, wherein said first position indicating means includes one-bit width (m+1)-stages associated with said m-stage n-word queue, a second stage to an (m+1)th stage of said first position indicating means corresponding to a first (m)th stage of said m-stage n-word queue, only one stage of said second stage to said (m+1)th stage of said first position indicating means storing a predetermined bit such that a stage position of said predetermined bit stored in said first position indicating means indicates said head position of said upper half of instruction codes or data latched in said m-stage n-word queue, and said second position indicating means includes a second position indicating means of one-bit width (m+1)-stages associated with said m-stage n-word queue, a second stage to an (m+1)th stage of said second position indicating means corresponding to a first m(th) stage of said m-stage n-word queue, only one stage of said second stage to said (m+1)th stage of said second position indicating means storing a predetermined bit such that a stage position of said predetermined bit stored in said second position indicating means indicates said head position of said lower half of instruction codes or data latched in said m-stage n-word queue, and when said predetermined bit is positioned at a first stage of each of said first and second position indicating means, said predetermined bit indicating that said m-stage n-word queue is empty.

4. A queue apparatus as claimed in claim 3, wherein said control means includes a queue controller for receiving a write signal from said bus controller and first and second read signals from said execution unit, said queue controller responsive to the write signal and the first and second read signals for selectively shifting said first and second position indicating means toward an input and an output side of said multi-stage memory means.

5. A queue apparatus as claimed in claim 4 wherein m is 4 and n is 2.

6. A queue apparatus comprising:
a multi-stage memory means for storing instruction codes or data in a first-in first-out manner, said multi-stage memory means having a plurality of stages, each stage storing instruction codes or data which can be divided into a first portion including a most significant bit or said instruction codes or data stored in each of said stages and a second portion including a least significant bit of said instruction codes or data stored in each of said stages;
first position indicating means, coupled to said multi-stage memory means, for indicating a head position of first portions of instruction codes or data stored in said plurality of stages of said multi-stage memory means;
second position indicating means, coupled to said multi-stage memory means, for indicating a head position of second portions of instruction codes or data stored in said plurality of stages of said multi-stage memory means;
exchanging means, coupled to said multi-stage memory means, for receiving said first and second portions of instruction codes or data read out from said multi-stage memory means and for selectively exchanging respective portions of said first and second portions of received instruction codes or data with each other; and control means receiving a first read signal and second read signal from an execution unit and a write signal from a bus control unit, respectively, said first read signal indicating a reading of a portion of one instruction code stored in one stage of said multi-stage memory means, and said second read signal indicating a reading of both of said first and second portions of one instruction code stored in one stage of said multi-stage memory means, said control means responding to said write signal and said first and second read signals for controlling said first and second position indicating means so as to cause said first and second position indicating means to shift toward an output side of said multi-stage memory means an indication position of respective head positions of the first and second portions of all instruction codes or data stored in said plurality of stages of said multi-stage memory means, said control means responding to said first read signal so as to cause only one of said first and second position indicating means to shift toward an input side of said multi-stage memory means, the indication position of the head position of the corresponding portion of all instruction codes or data stored in said plurality of stages of said multi-stage memory means and said control means responding to said second read signal so as to cause both of said first and second position indicating means to shift the indication position of the respective head positions of the first and second portions of all instruction codes or data stored in said plurality of stages of said multi-stage memory means toward an input side of said multi-stage memory means, said control means also operating in such a manner that when said second read signal is generated, on the basis of said first and second portions of said multi-stage memory means, instruction codes or data are read in response to the first read signal most recently before said second read signal is generated, said control means controls said exchanging means such that instruction codes or data read out from said multi-stage memory means are outputted to said execution unit in a proper sequence in which said first and second portions of said instruction codes or data read out from said multi-stage memory means are arranged in accordance with a proper order of address.

7. A queue apparatus, comprising:
a m-stage n-word queue coupled to a bus controller for receiving instruction codes or data in units of n words, said m-stage n-word queue storing received instruction codes or data in a first-in first-out manner, each stage of said m-stage n-word queue storing instruction codes or data which can be divided into an upper half, including a most significant bit of said instruction codes or data stored in each of said stages and a lower half, including a least significant bit of said instruction codes or data stored in each of said stages;
a first queue pointer, coupled to said m-stage n-word queue, for indicating a head position of upper halves of all instruction codes or data stored in said plurality of stages of said m-stage n-word queue;
a second queue pointer, coupled to said m-stage n-word queue, for indicating a head position of lower halves of all instruction codes or data stored in said plurality of stages of said m-stage n-word queue;

exchanging means, coupled to said m-stage n-word queue, for independently receiving the upper and lower halves of instruction codes or data read out from said m-stage n-word queue and for selectively exchanging respective positions of received upper and lower halves or instruction codes or data to each other; and a queue controller for receiving a write signal from said bus controller and first and second read signals from an execution unit, said first read signal indicating n/2-word reading, and said second read signal indicating a n-word reading, said queue controller responsive to the write signal and the first and second read signals for selectively shifting said first and second queue pointers toward an input and an output side of said m-stage n-word queue so that said first and second queue pointers respectively indicate updated head positions of the upper and lower halves of all instruction codes or data stored in said plurality of stages of said m-stage n-word queue, said queue controller responding to said first read signal so as to cause only one of said first and second queue pointers to shift toward an input side of said m-stage n-word queue, the updated head position of the corresponding half of all instruction codes or data stored in said plurality of stages of said m-stage n-word queue and said queue controller responding to said second read signal so as to cause both of said first and second queue pointers to shift the updated head position of the respective head positions of the upper and lower halves of all instruction codes or data stored in said plurality of stages of said m-stage n-word queue toward an input side of said m-stage n-word queue, said queue controller also operating in such a manner that when said second read signal is generated, on the basis of said first and second halves of said m-stage n-word queue, instruction codes or data are read in response to the first read signal most recently before said second read signal is generated, said queue controller controls said exchanging means such that the instruction codes or data read out from said m-stage n-word queue are outputted to said execution unit in a proper sequence in which upper and lower halves of said instruction codes or data read out from said m-stage n-word queue are arranged in accordance with a proper order of address.

8. A queue apparatus as claimed in claim 7, wherein said first queue pointer includes one-bit width $(m+1)$-stages associated with said m-stage n-word queue, a second stage to the $(m+1)$th stage of said first queue pointer corresponding to a first stage of a (m)th stage of said m-stage n-word queue, only one stage of said second stage to said $(m+1)$th stage of said first queue pointer storing a predetermined but such that a stage position of said predetermined bit stored in said first queue pointer indicates said head position of said upper half of instruction codes or data latched in said m-stage n-word queue, and said second queue pointer includes a second queue pointer of one-bit width $(m+1)$-stages associated with said m-stage n-word queue, a second stage of the $(m+1)$th stage of said second queue pointer corresponding to a first stage to a m(th) stage of said m-stage n-word queue, only one stage of said second stage to said $(m+1)$th stage of said second queue pointer storing a predetermined bit such that a stage position of said predetermined bit stored in said second queue pointer indicates that head position of said lower half of instruction codes or data latched in said m-stage n-word queue, and when said predetermined bit is positioned at a first stage of each of said first and second queue pointers, said predetermined bit indicating that said m-stage n-word queue is empty.

* * * * *